(12) United States Patent
Heydinger et al.

(10) Patent No.: US 7,557,954 B2
(45) Date of Patent: Jul. 7, 2009

(54) FAST COLOR INTERPOLATION

(75) Inventors: Scott M. Heydinger, Lexington, KY (US); Dean A. Pulsifier, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 583 days.

(21) Appl. No.: 11/238,434

(22) Filed: Sep. 29, 2005

(65) Prior Publication Data

US 2007/0070366 A1    Mar. 29, 2007

(51) Int. Cl.
*H04N 1/60*    (2006.01)
*H04N 1/46*    (2006.01)
*G06K 9/00*    (2006.01)

(52) U.S. Cl. .................. 358/1.9; 358/504; 358/523; 358/525; 382/162; 382/167; 382/300

(58) Field of Classification Search ............... 358/1.9, 358/529, 1.18, 518, 2.1, 3.23, 517, 515, 504, 358/523, 525; 382/162, 167, 300; 345/589, 345/604, 591, 600, 601, 603, 606; 702/27; 348/51
See application file for complete search history.

(56) References Cited

U.S. PATENT DOCUMENTS

| | | | |
|---|---|---|---|
| 5,796,632 A * | 8/1998 | Yuta | 702/27 |
| 6,049,400 A | 4/2000 | Vondram, Jr. | |
| 6,115,031 A | 9/2000 | Love et al. | |
| 6,160,635 A | 12/2000 | Usami | |
| 6,335,800 B1 | 1/2002 | Balasubramanian | |
| 6,373,580 B1 | 4/2002 | Walker | |
| 6,421,140 B1 | 7/2002 | Hui | |
| 6,571,010 B1 | 5/2003 | Inoue | |
| 6,636,629 B1 | 10/2003 | Sasai | |
| 6,650,336 B2 * | 11/2003 | Suzuki | 345/589 |
| 6,724,500 B1 | 4/2004 | Hains et al. | |
| 6,809,740 B1 | 10/2004 | Weed | |
| 6,870,636 B2 | 3/2005 | Kulkarni | |
| 6,873,432 B1 | 3/2005 | Thieret | |
| 6,995,881 B2 * | 2/2006 | Iida et al. | 358/529 |
| 2002/0080232 A1 * | 6/2002 | Hiratsuka et al. | 348/51 |

* cited by examiner

*Primary Examiner*—Edward L Coles
*Assistant Examiner*—Charlotte M Baker
(74) *Attorney, Agent, or Firm*—Taylor & Aust, PC

(57) ABSTRACT

A method of performing color conversion to convert a set of input color values to color values in an output color space includes representing an output color in the output color space as a geometric lattice having a plurality of lattice points, each of the plurality of lattice points having an address defined by a particular set of input color values; using a set of input color values with respect to the geometric lattice to determine a set of lattice points that neighbor a point corresponding to the set of input color values to be interpolated; choosing a random number; and utilizing the random number to select a first lattice point of the set of lattice points to provide as a pseudo-interpolated result of the color conversion.

15 Claims, 5 Drawing Sheets

FAST COLOR INTERPOLATION

BACKGROUND OF THE INVENTION

1. Field of the Invention.

The present invention relates to color interpolation, and, more particularly, to a method of performing color conversion to convert a set of RGB (red, green, blue) color values to color values in an output color space using fast color interpolation.

2. Description of the Related Art.

An imaging apparatus, such as an ink jet printer, typically utilizes a printer driver which converts 3-channel additive RGB data into n-channel subtractive ink colorant data. Typically, where n=4, the colorants are cyan, magenta, yellow and black. The relationship between the additive and subtractive color spaces is very nonlinear, thereby requiring a general functional conversion capability. Typically, a 3-dimensional color conversion table is employed, which is commonly implemented as a "C" programming array inside the printer driver code. The color conversion table is often depicted as a three dimensional lattice cube.

The array of the lattice cube is indexed by three 8-bit values on the range 0 to 255 that correspond to R (red), G (green), and B (blue) image information. There are n arrays, one for each ink type. A common "color table" with n=4 for cyan, magenta, yellow, and black is therefore declared as follows: unsigned char Cya[17][17][17]; unsigned char Mag[17][17][17]; unsigned char Yel[17][17][17]; and unsigned char Blk[17][17][17]. The example shows a commonly used array size, in which there are 17 samples along each of the red, green and blue axes, which by convention of the "C" programming language are indexed by values on the range 0 to 16, inclusive. The 17×17×17 size (referred to as a "17 cube") has been found to be a good tradeoff between array size and quality of conversion. For the sake of convention, the array indices are indexed in the order [red][green][blue]. The objective of the color table is to provide information about which inks, and how much of each ink, should be used to print any specified combination of colors given in the RGB color space.

There are several known methods that may be used to perform color conversion between additive and subtractive color spaces employing the color table identified above.

One such method to select a lattice point Q from the lattice cube based on RGB input values is referred to as bit truncation. Given that RGB values are provided in 8-bit form for each of the three channels, the higher order (known as the "most significant") 4 bits of each may be utilized to index independently each of the three channels of the conversion table. The method of bit truncation has the advantage of being fast to execute, since ignoring the four least significant bits of each of the RGB values is trivially executed by a general purpose processor. Bit truncation has a second important advantage in that colors that correspond to shades of gray (such colors have the property that R=G=B) will be taken from what is known as the "neutral axis" of the color table. However, bit truncation has the disadvantage commonly referred to as "contouring", wherein multiple sets of RGB values will index the same location in the conversion table, i.e., the same ink data will be retrieved for multiple RGB values, even though the multiple sets of RGB values refer to different colors.

One approach used to overcome the contouring problem is known as trilinear interpolation. In trilinear interpolation, the most significant bits are used to determine a "subcube" of eight nearby lattice points in the 17 cube that correspond to the lattice point Q, plus all of the additional seven combinations of lattice points found by increasing the index by one lattice coordinate along each dimension. The least significant bits are used to provide a weight to, or average, to the nearby lattice points. Trilinear interpolation provides a sound interpolation strategy in the context of color conversion, since its use of the least significant bits of RGB reduces the problem of contouring. However, because of the complexity of the interpolation expression, trilinear interpolation is generally much slower in execution than bit truncation. Also, if a point P lies on the neutral axis, the interpolated result will unfortunately be adversely impacted by a total of eight lattice points, of which only two are tweaked to be visually neutral.

Tetrahedral interpolation was developed to overcome the neutral axis problem of trilinear interpolation. Instead of one lattice point being used to evaluate the point P (as in bit truncation) or eight lattice points (as in trilinear interpolation), only four lattice points are weighted in three dimensional tetrahedral interpolation. Although tetrahedral interpolation has the advantage of preserving the neutral axis and not exhibiting significant contouring, tetrahedral interpolation is still complicated, and thus, is generally slow to execute.

SUMMARY OF THE INVENTION

The invention, in one form thereof, is directed to a method of performing color conversion to convert a set of input color values to color values in an output color space. The method includes representing an output color in the output color space as a geometric lattice having a plurality of lattice points, each of the plurality of lattice points having an address defined by a particular set of input color values; using a set of input color values with respect to the geometric lattice to determine a set of lattice points that neighbor a point corresponding to the set of input color values to be interpolated; choosing a random number; and utilizing the random number to select a first lattice point of the set of lattice points to provide as a pseudo-interpolated result of the color conversion.

The invention, in another form thereof, is directed to a method of performing color conversion to convert a set of input color values to color values in an output color space. The method includes representing an output color in the output color space as a cubic lattice having a plurality of lattice points defining a plurality of subcubes, each of the plurality of lattice points having an address defined by a particular set of input color values; using a set of input color values with respect to the cubic lattice to determine a set of four tetrahedron lattice points out of a set of eight subcube lattice points representing a subcube in the cubic lattice that neighbor a point corresponding to the set of input color values to be interpolated; and determining a lattice point of the set of four tetrahedron lattice points to provide as a pseudo-interpolated result of the color conversion in a non-constrained manner, wherein repeating the determining for the set of input color values does not necessitate a determining of a same lattice point of the set of four tetrahedron lattice points to provide as the pseudo-interpolated result of the color conversion.

The invention, in another form thereof, is directed to a method of performing color conversion to convert a set of RGB (red, green, blue) color values to color values in an output color space. The method includes representing an output color in the output color space as a cubic lattice having a plurality of lattice points defining a plurality of subcubes, each of the plurality of lattice points having an address defined by a particular set of RGB color values; using a set of RGB color values with respect to the cubic lattice to determine a set of four tetrahedron lattice points out of a set of eight subcube lattice points representing a subcube in the cubic lattice that neighbor a point corresponding to the set of RGB color values to be interpolated; choosing a random number X; and choosing a first lattice point of the set of four tetrahedron lattice points according to the following algorithm:

if (Bn>X)

the chosen lattice point=Pxyz1 else if (Go>X)

the chosen lattice point=Pxyz2 else if (Rq>X)

the chosen lattice point=Pxyz3 else the chosen lattice point=Pxyz4 wherein: X is the random number; Bn is the lower n least significant bits of the blue value; Go is the lower o least significant bits of the green value; Rq is the lower q least significant bits of the red value; each of Pxyz1, Pxyz2, Pxyz3, Pxyz4 is one of the set of four tetrahedron lattice points; and each of n, o, q is an integer.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
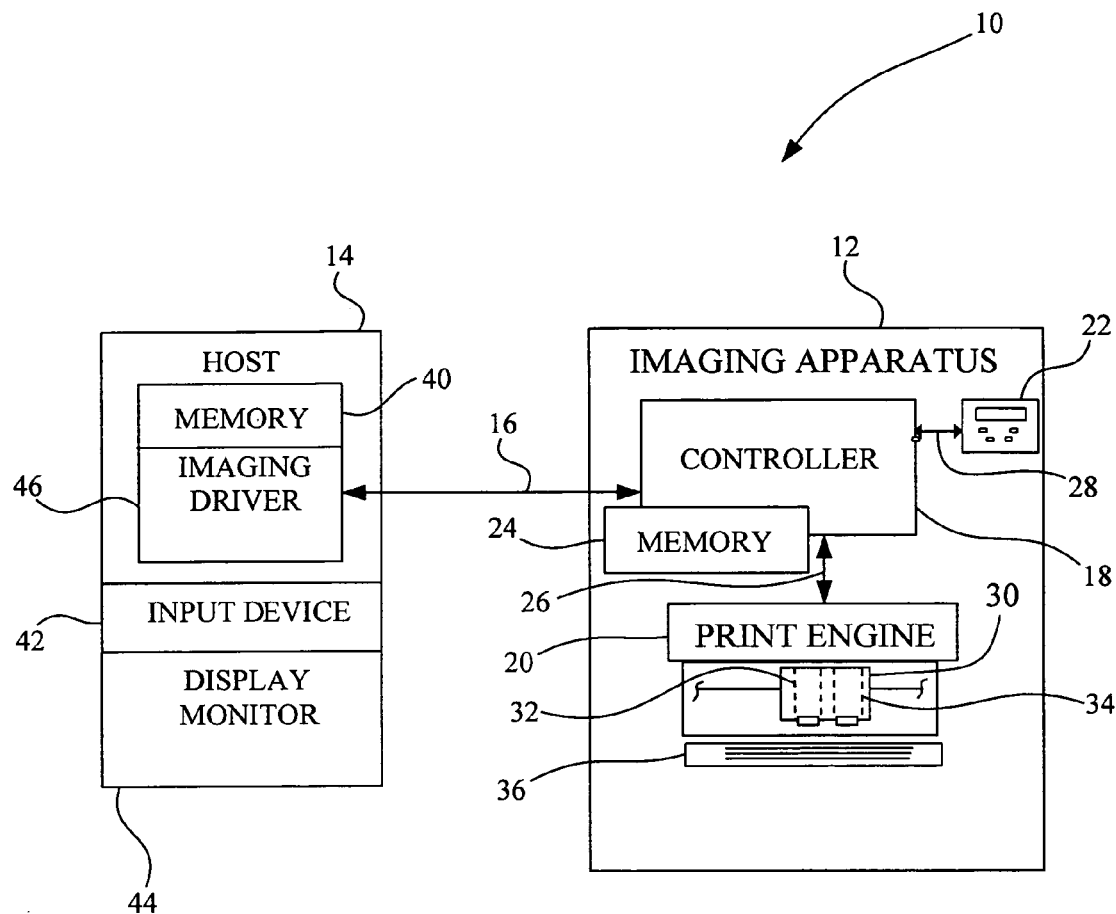
FIG. 1 is a diagrammatic depiction of an imaging system that employs an imaging apparatus in accordance with the present invention.

Referring now to the drawings, and particularly to FIG. 1, there is shown a diagrammatic depiction of an imaging system 10 embodying the present invention. Imaging system 10 includes an imaging apparatus 12 and a host 14. Imaging apparatus 12 communicates with host 14 via a communications link 16.

As used herein, the term "communications link" generally refers to structure that facilitates electronic communication between two components, and may operate using wired or wireless technology. Accordingly, communications link 16 may be, for example, a direct electrical wired connection, a direct wireless connection (e.g., infrared or r.f.), or a network connection (wired or wireless), such as for example, an Ethernet local area network (LAN) or a wireless networking standard, such as IEEE 802.11.

Imaging apparatus 12 may be, for example, an ink jet printer and/or copier, or an all-in-one (AIO) unit that includes an inkjet printer, a scanner, and possibly a fax unit. In the present embodiment, imaging apparatus 12 may include, for example, a controller 18, a print engine 20, and a user interface 22.

Controller 18 includes a processor unit and associated memory 24, and may be formed as one or more Application Specific Integrated Circuits (ASIC). Controller 18 is a printer controller, but may alternatively be a scanner controller, or combined printer and scanner controller. Although controller 18 is depicted in imaging apparatus 12, alternatively, it is contemplated that all or a portion of controller 18 may reside in host 14. Controller 18 is communicatively coupled to print engine 20 via a communications link 26, and to user interface 22 via a communications link 28. Controller 18 serves to process print data and to operate print engine 20 to perform printing.

Print engine 20 may include a reciprocating carrier 30 that is configured to mount, for example, one or more of color printhead cartridge 32 and monochrome, e.g., black, printhead cartridge 34 to print on a substrate 36.

Each printhead cartridge includes, for example, an array of ink jetting nozzles in fluid communication with a reservoir containing one or more types of ink. Color printhead cartridge 32 includes various colors of ink, such as for example, cyan (C), magenta (M), and yellow (Y) inks. Color printhead cartridge 32 may be configured with a nozzle array that produces at least two drop sizes, or drop masses, of ink, including a large drop mass and a small drop mass. In some embodiments, monochrome printhead cartridge 34 may be replaced with a photo printhead cartridge to facilitate six color printing. For example, a photo printhead cartridge typically includes diluted inks of certain colors, such as diluted cyan (c), and diluted magenta (m) inks, whereas color printhead cartridge 32 may include only saturated inks. The term, "saturated" refers to the fact that the inks are full-strength such as the inks used by conventional CMYK ink jet printers, and are not, for example, diluted inks. The inks may be, for example, one or both of pigment-based inks and dye-based inks.

Substrate 36 is a print medium, and may be one of many types of print media, such as a sheet of plain paper, fabric, photo paper, coated ink jet paper, greeting card stock, transparency stock for use with overhead projectors, iron-on transfer material for use in transferring an image to an article of clothing, and back-lit film for use in creating advertisement displays and the like. As an ink jet print engine, print engine 20 operates color printhead cartridge 32 and photo printhead cartridge 34 to eject ink droplets onto substrate 36 in order to reproduce text or images, etc.

Host 14 may be, for example, a personal computer, including memory 40, an input device 42, such as a keyboard, and a display monitor 44. Host 14 further includes a processor, input/output (I/O) interfaces, and at least one mass data storage device, such as a hard drive, a CD-ROM and/or a DVD unit. Memory 40 may be, for example, one or more types of random access memory (RAM), read only memory (ROM), and/or non-volatile (NV)RAM.

During operation, host 14 includes in its memory a software program including program instructions that function as an imaging driver 46, e.g., printer driver software, for imaging apparatus 12. Imaging driver 46 is in communication with controller 18 of imaging apparatus 12 via communications link 16. Imaging driver 46 facilitates communication between imaging apparatus 12 and host 14, and may provide formatted print data to imaging apparatus 12, and more particularly, to print engine 20. Although imaging driver 46 is disclosed as residing in memory 40 of host 14, it is contemplated that, alternatively, all or a portion of imaging driver 46 may be located in controller 18 of imaging apparatus 12, for example, in memory 24 or as a firmware component of controller 18.

Figure 2:
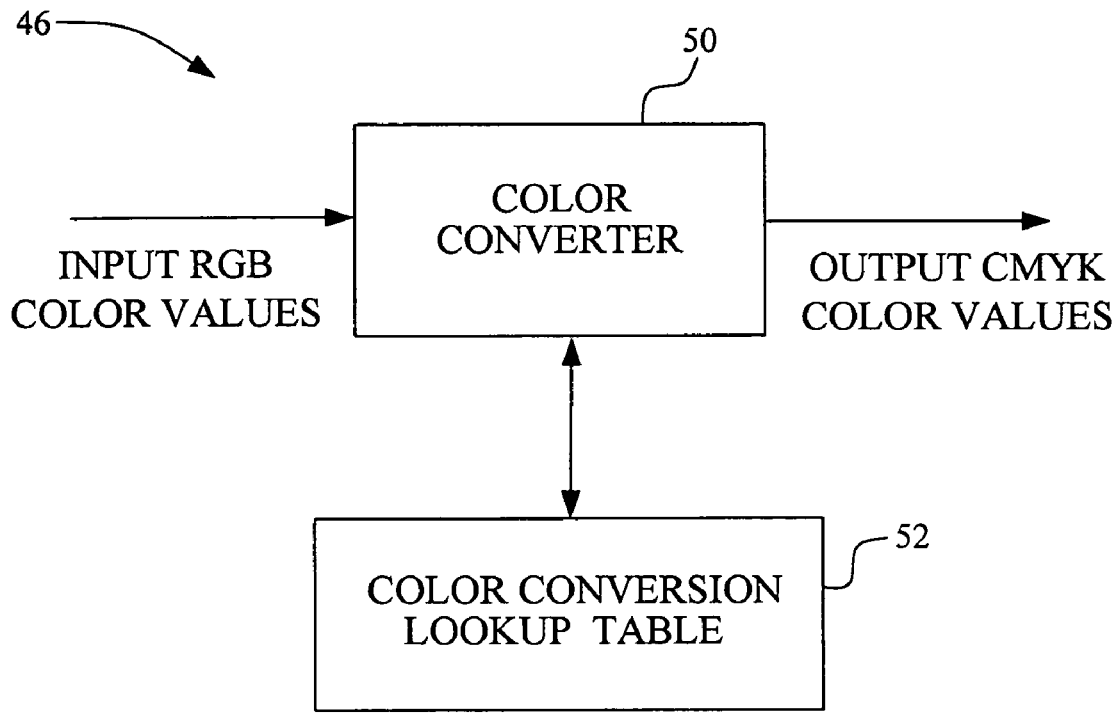
FIG. 2 is a diagrammatic depiction of a color converter accessing a color conversion lookup table in accordance with the embodiment of FIG. 1.

Referring now to FIG. 2, imaging driver 46 includes a color converter 50. Although described herein as residing in imaging driver 46, color converter 50 may be in the form of firmware, hardware or software, and may reside in either imaging driver 46 or controller 18. Alternatively, some portions of color converter 50 may reside in imaging driver 46, while other portions reside in controller 18.

Color converter 50, in conjunction with a color conversion lookup table 52, converts input color space data, e.g., RGB color values, such as that compatible with display monitor 44, to output color space data, e.g., output color values compatible with imaging apparatus 12. For example, the output color values may be in the form of CMYK data, or CMYKcm data. Color conversion lookup table 52 is a multidimensional lookup table having at least three dimensions, and includes RGB color values as inputs and the corresponding output values, e.g., CMYK color values. Color conversion lookup table 52 may be established in the code of imaging driver 46, or may be established in memory, such as memory 24 or memory 40. Alternatively, color conversion lookup table 52 may be in the form of groups of polynomial functions capable of providing the same multidimensional output as if in the form of a lookup table.

Figure 3:
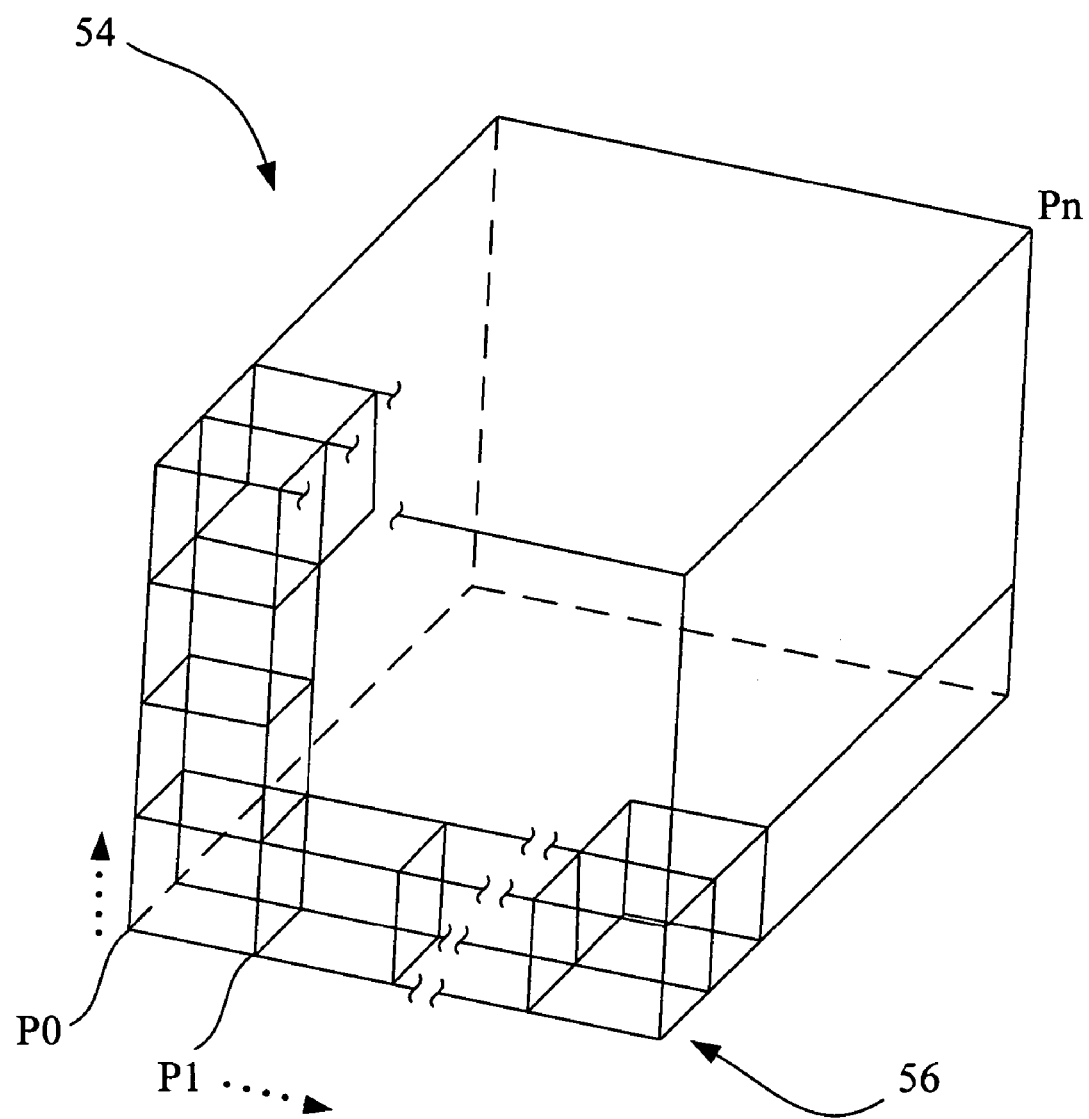
FIG. 3 is a diagrammatic representation of a cubic lattice used for purposes of explaining the operation of the present invention.

Referring also to FIG. 3, color conversion lookup table 52 may be represented in the form of a cubic lattice 54, such as for example a 17×17×17 cube, having a finite number of output colors values. One color conversion lookup table 52 may be provided for each plane in the output color space. For example, an output color, such as for example one of C, M, Y, in the output color space may be represented as a cubic lattice having a plurality of lattice points, P0, P1 ... Pn, defining a plurality of subcubes 56, with each of the plurality of lattice points Pn having an address defined by a particular unique set of the RGB color values, in a one-for-one manner. In the example of FIG. 3 depicting cubic lattice 54, only a portion of the plurality of subcubes 56 are shown for ease of illustration. The number of potential sets of RGB color values, however, far exceeds the number of output color value entries available from color conversion lookup table 52. As such, color converter 50 provides a mechanism by which RGB color values that do not directly correlate to one of the output color values of a particular lattice point may be interpolated to one of the lattice points of the cubic lattice, and in turn to one of the output color values available from color conversion lookup table 52.

Figure 4:
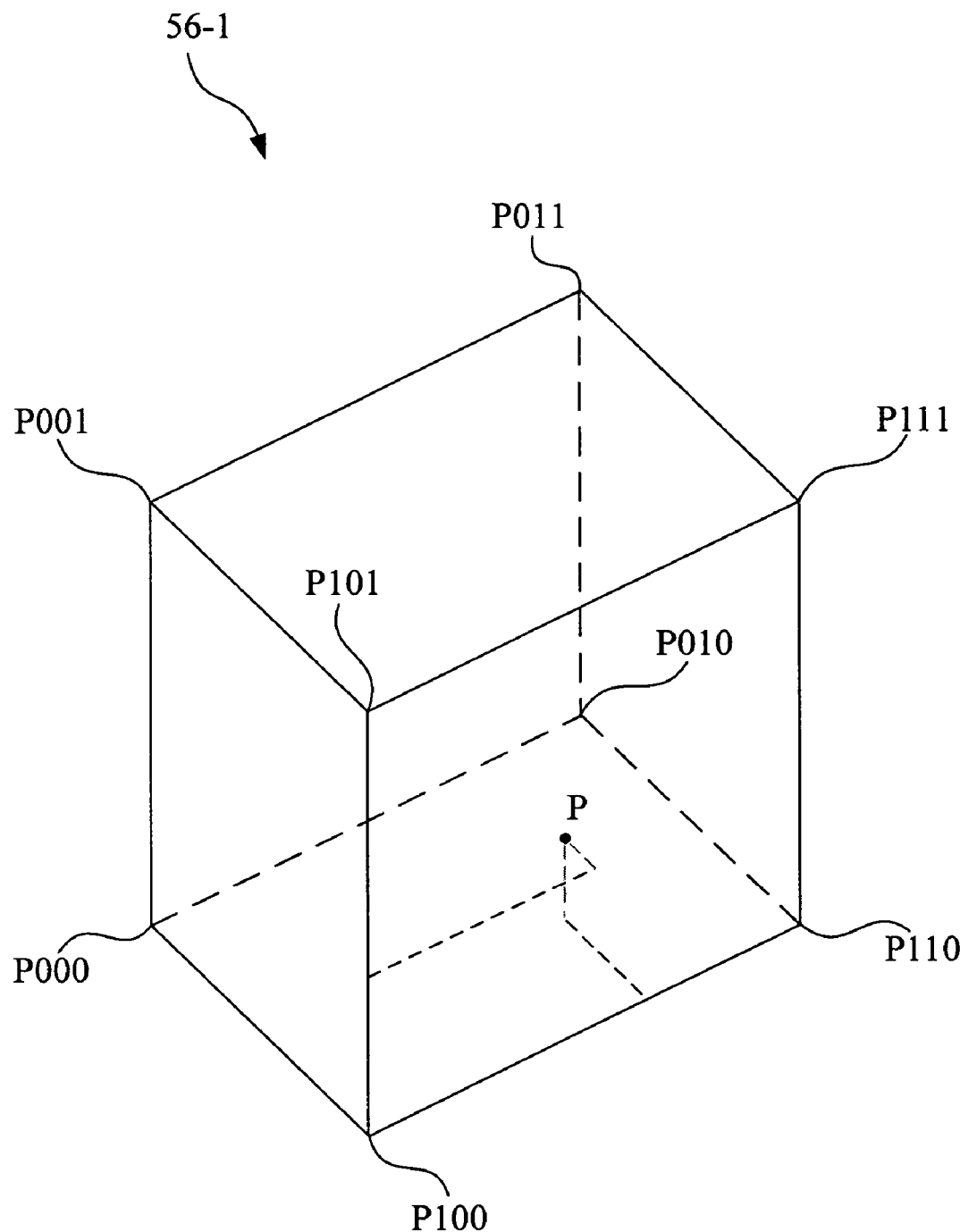
FIG. 4 is a diagrammatic representation of one of the subcubes of the cubic lattice of FIG. 3.

FIG. 4 shows one subcube, identified as subcube 56-1, which generically represents any one of the plurality of subcubes 56 of the cubic lattice 54 of FIG. 3, for purposes of illustration in understanding the present invention. Subcube 56-1 includes a plurality of lattice points, e.g., eight lattice points, labeled in the form of Pxyz, e.g., P000, P001, P010, P011, P100, P101, P110, and P111.

Figure 5:
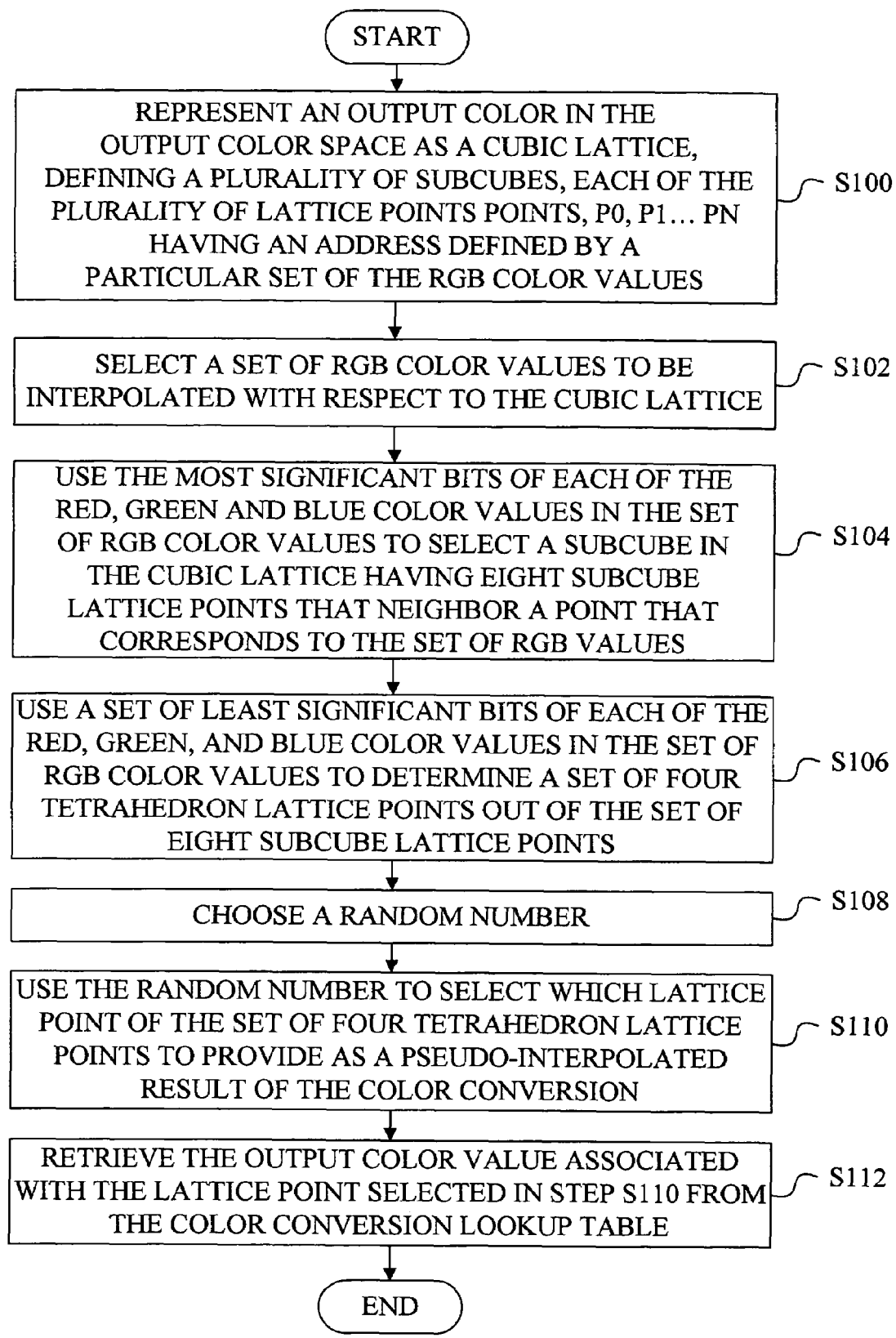
FIG. 5 is a flowchart that generally depicts a method of performing color conversion to convert a set of RGB (red, green, blue) color values to color values in an output color space, in accordance with the present invention.

FIG. 5 is a flowchart of a method of performing color conversion to convert a set of RGB (red, green, blue) color values to color values in an output color space, in accordance with the present invention. The method may be implemented, for example, by program instructions executed by controller 18 of imaging apparatus 12, or alternatively, by host 14, which may be a part of imaging driver 46.

At step S100, an output color in the output color space is represented as a cubic lattice, e.g., cubic lattice 54, having a plurality of lattice points P0, P1 ... Pn,, defining a plurality of subcubes 56, each of the plurality of lattice points, P0, P1 ... Pn having an address defined by a particular set of the RGB color values.

At step S102, a set of RGB color values is selected to be interpolated with respect to cubic lattice 54. In the example that follows, the set of RGB color values will be R=204, G=87 and B=35. The set of RGB color values includes a plurality of bits, e.g., eight bits, representing a red (R) color component, a plurality of bits, e.g., eight bits, representing a green (G) color component, and a plurality of bits, e.g., eight bits, representing a blue (B) color component.

At step S104, a set of most significant bits, i.e., the upper four bits, of each of the plurality of bits representing the red (R) color component, the plurality of bits representing the green (G) color component, and the plurality of bits representing the blue (B) color component in the set of RGB color values is used to determine a subcube, e.g., subcube 56-1 shown in FIG. 4, of the plurality of subcubes 56 shown in FIG. 3. Referring to FIG. 4, subcube 56-1 has a set of eight subcube lattice points, labeled P000-through P111, that neighbors a point P corresponding to the set of RGB color values (e.g., RGB=200, 87, 35) to be interpolated. Step S104 may be performed using algorithms known in the art, such as bit truncation, to select the set of eight subcube lattice points.

At step S106, a set of least significant bits, e.g., the lower four bits, of each of the plurality of bits representing the red (R) color component, the plurality of bits representing the green (G) color component, and the plurality of bits representing the blue (B) color component in the set of RGB color values (e.g., RGB=200, 87, 35) is used to determine a set of four tetrahedron lattice points out of the set of eight subcube lattice points. The n least significant bits of each color will be designated using the convention Rn, Gn, Bn, wherein n is an integer, and from the example above with RGB=200, 87, 35, then the four least significant bits (n=4) evaluate to R4=12, G4=7 and B4=3. In this example, for ease of discussion, it will be assumed that the four lower bits will point to the four tetrahedron lattice points P000, P100, P110, and P111. Step S106 may be performed using algorithms known in the art, such as those associated with conventional tetrahedral interpolation, to select the four tetrahedron lattice points.

At step S108, a random number is chosen. For example, a uniformly distributed random number X is generated on the range of 0 to 15, inclusive. The random number may be generated, for example, using a linear feedback shift register (LFSR).

At step S110, the random number is used to select which lattice point of the set of four tetrahedron lattice points, e.g., which of the four tetrahedron lattice points P000, P100, P110, and P111, to provide as a pseudo-interpolated result of the color conversion.

In general, a lattice point Pxyz is chosen according to the following algorithm, which selects a particular lattice point based on the desired respective probabilities:

if (D>X)

the chosen lattice point=Pxyz1 else if (E>X)

the chosen lattice point=Pxyz2 else if (F>X)

the chosen lattice point=Pxyz3 else the chosen lattice point=Pxyz4 wherein:

X is a random number; D is the lower n least significant bits of a first color value of the set of input color values value; E is the lower o least significant bits of a second color value of the set input color values; F is the lower q least significant bits of a third color value of the set of input color values; each of Pxyz1, Pxyz2, Pxyz3, Pxyz4 is one of the set of four tetrahedron lattice points, which is a subset of the set of eight sub-cube lattice points; and n, o and q are integers. The variables n, o and q may be different integers, or may be the same integer, based on the desired implementation.

As a more specific example, with reference to FIG. 4, the lattice point Pxyz is chosen according to the following algorithm, which selects a particular lattice point based on the desired respective probabilities:

if (B4>x)

the chosen lattice point=P111 else if (G4>X)

the chosen lattice point=P110 else if (R4>X)

the chosen lattice point=P100 else the chosen lattice point=P000

At step S112, the output color value associated with the lattice point selected in step S110 is retrieved from color conversion lookup table 52.

Those skilled in the art will recognize that the method described above may be used in performing color conversion for each color in the output color space, such as for example, CMYK or CMYKcm.

The method of the present invention provides negligible contouring and favorable gray rendition characteristics, while performing significantly faster than conventional tetrahedral color conversion. For example, one simulation of the method of the present invention demonstrated a reduction in process time to about ⅔ of the processing time required to generate a similar color conversion using conventional tetrahedral color conversion.

The present invention aids in the reduction or elimination of contouring by permitting non-integer interpolated color values to be achieved in effect, which in turn allows for representation and rendering on paper of more visually discernable shades. For example, wherein a shade may be represented as a value in the range of 0-255, inclusive, shades 150/255 and 151/255 may not be visually discernable; however, it is well known in the art that shades 0, 1 and 2, and possibly several other of the very lightest shades, are visually discernable and that it is desirable to be able to represent fractional ink amounts between these integer values.

The generation of non-integer interpolated color values, in effect, is demonstrated by the example that follows. For simplicity, only one dimension of interpolation is shown, and in which a single "input gray value" on the range of 0 to 255 is used to index a "black ink only" table with 17 samples. For the sake of simplicity and without loss of generality, an input gray value of 0 represents white, an input gray value of 16 represents a very light shade of gray and an input gray value of 255 represents solid black.

Further for the sake of convention, the BlackInkOnly[ ] color table array is declared as follows using C programming conventions: unsigned char BlackInkOnly[17]; and has 17 sampled values. The first storage location has a lookup value of 0, i.e. BlackInkOnly[0]=0, and means "print no black dots to make the color white". The second location has a lookup value of 3, i.e. BlackInkOnly[1]=3, represents a light shade of gray corresponding to the input gray value of 16 and means "print 3 out of every 255 dots, on average, to represent input gray value 16".

Traditionally, the interpolated color values stored as the results coming from the color conversion module are also declared as type unsigned char, using C programming terminology. The type unsigned char is represented by 8 bits that can represent integral values on the range 0 to 255, inclusive. Therefore, the color values coming from a color conversion module are restricted to having integer color values on the range 0 to 255, inclusive. This is unfortunate in that the human visual system can detect a difference between the shades 0 and 1 (out of 255), between 1 and 2 (out of 255), etc., for several of the lightest shades. Yet, due to limits stemming from how the gray shades are represented, no shades in between 0, 1, 2, etc. can be represented. Consider as a specific conversion example an input gray value of 4 sent to a color table for interpolation. Given this input value, the one-dimensional interpolation formula is as follows:

unsigned char InterpolatedColorvalue=

(BlackInkOnly[0]*12+BlackInkOnly[1]*4)/16=
    (0*12+3*4)/16

=12/16

=0.75

The weights of 12/16 and 4/16 represent "weighted distances", appropriate for the simplified exemplary case of linear interpolation, similar to the "weighted areas" of bilinear interpolation and "weighted volumes" for tri-linear interpolation. Since the prior art color conversion returns the same interpolated value for the same input value for every single pixel having that input value, and further since the interpolated values are restricted to integer values only, the shade 0.75 cannot be represented. Instead, the color conversion would round to the nearest integer value, e.g., 1 in this example.

The present invention, however, is not constrained to always return the same interpolated value for a given input value. Instead, the invention would return the value of BlackInkOnly[0] with a frequency of 12/16 for the input gray value of 4, and BlackInkOnly[1] with a frequency of 4/16 for this input gray value. Over multiple pixels, the average value AV=(BlackInkOnly[0]*12+BlackInkOnly[1]*4)/16=(0*12+3*4)/16=12/16=0.75, which corresponds to the desired interpolated value.

It should be noted that in this case no additional bits are required to represent this value since only the integral values 0 (BlackInkOnly[0]) and 3 (BlackInkOnly[1]) are returned as individual interpolated results. However, by adjusting the frequency of occurrence of these two values a non-integral average is easily obtained and represented. Further, it is known to those skilled in the art of halftoning that a pattern of 0's and 3's, being relatively close in value, can easily be rendered into a pleasing pattern of dots by the halftoning algorithm known as error diffusion.

A summary of results for the lightest 17 shades, represented by input values 0 through 16, inclusive, is shown in Table 1, below. The weights for BlackInkOnly[0] and BlackInkOnly[1] are shown for each shade, followed by the floating point interpolated value of the prior art for each shade. However, since the prior art color conversion is constrained to integer values, the floating point interpolated values have been rounded and it is clearly seen that only four unique rounded shades are available to represent supposedly 17 visually distinct input values that have been considered. This reduction from unique input values to a smaller set of actual output values is known as "blocking".

TABLE 1

Comparison of output values obtained by rounding vs. averaging

| Input Value | [0] weight | [1] weight | interpolated value | rounded interpolated value | average returned value |
|---|---|---|---|---|---|
| 0 | 1.0000 | 0.0000 | 0.0000 | 0 | 0.0000 |
| 1 | 0.9375 | 0.0625 | 0.1875 | 0 | 0.1875 |
| 2 | 0.8750 | 0.1250 | 0.3750 | 0 | 0.3750 |
| 3 | 0.8125 | 0.1875 | 0.5625 | 1 | 0.5625 |
| 4 | 0.7500 | 0.2500 | 0.7500 | 1 | 0.7500 |
| 5 | 0.6875 | 0.3125 | 0.9375 | 1 | 0.9375 |
| 6 | 0.6250 | 0.3750 | 1.1250 | 1 | 1.1250 |
| 7 | 0.5625 | 0.4375 | 1.3125 | 1 | 1.3125 |
| 8 | 0.5000 | 0.5000 | 1.5000 | 2 | 1.5000 |
| 9 | 0.4375 | 0.5625 | 1.6875 | 2 | 1.6875 |
| 10 | 0.3750 | 0.6250 | 1.8750 | 2 | 1.8750 |
| 11 | 0.3125 | 0.6875 | 2.0625 | 2 | 2.0625 |
| 12 | 0.2500 | 0.7500 | 2.2500 | 2 | 2.2500 |
| 13 | 0.1875 | 0.8125 | 2.4375 | 2 | 2.4375 |
| 14 | 0.1250 | 0.8750 | 2.6250 | 3 | 2.6250 |
| 15 | 0.0625 | 0.9375 | 2.8125 | 3 | 2.8125 |
| 16 | 0.0000 | 1.0000 | 3.0000 | 3 | 3.0000 |
| | | Total Unique Shades: | | 4 | 17 |

As demonstrated in Table 1, in this example, conventional interpolation using rounding provides four unique rounded values of 0, 1, 2 and 3. In comparison, the present invention does not use rounding, and provides 17 possible values.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of performing color conversion by a color converter included in an imaging device to convert a set of input color values to color values in an output color space for use in printing using said imaging device, the method comprising:

receiving the set of input color values by the color converter included in the imaging device;

representing an output color in said output color space as a geometric lattice having a plurality of lattice points, each of said plurality of lattice points having an address defined by a particular set of input color values;

using the set of input color values with respect to said geometric lattice to determine a set of lattice points that neighbor a point corresponding to said set of input color values to be interpolated;

choosing a random number; and utilizing said random number to select a first lattice point of said set of lattice points to provide as a pseudo-interpolated result of said color conversion.

2. The method of claim 1, further comprising repeating said method for the same set of input color values, said method returning a second lattice point of said set of lattice points different from said first lattice point.

3. The method of claim 1, wherein as a result of said random number, said method is not constrained to always return the same lattice point of said set of lattice points for a given set of input color values.

4. The method of claim 1, wherein said first lattice point of said set of lattice points is chosen according to the following algorithm:

if (D>X)

the chosen lattice point=Pxyz1 else if (E>X)

the chosen lattice point=Pxyz2 else if (F>X)

the chosen lattice point=Pxyz3 else the chosen lattice point=Pxyz4 wherein:

X is said random number;

D is the lower n least significant bits of a first color value of said set of input color values value;

E is the lower o least significant bits of a second color value of said set input color values;

F is the lower q least significant bits of a third color value of said set of input color values;

each of Pxyz1, Pxyz2, Pxyz3, Pxyz4 is one of said set of lattice points; and each of n, o, and q is an integer.

5. The method of claim 1, wherein said set of input color values is a set of RGB color values.

6. The method of claim 5, wherein the act of using said set of input color values includes:

selecting said set of RGB color values to be interpolated with respect to said geometric lattice, said set of said input color values including a plurality of bits representing a red (R) color component, a plurality of bits representing a green (G) color component and a plurality of bits representing a blue (B) color component;

using a set of most significant bits of each of said plurality of bits representing said red (R) color component, said plurality of bits representing said green (G) color component and said plurality of bits representing said blue (B) color component in said set of RGB color values to determine said set of lattice points neighboring said point corresponding to said set of RGB color values to be interpolated; and using a set of least significant bits of each of said plurality of bits representing said red (R) color component, said plurality of bits representing said green (G) color component and said plurality of bits representing said blue (B) color component in said set of RGB color values to determine a subset of lattice points of said set of lattice points; and the act of utilizing said random number selects a lattice point from said subset of lattice points.

7. A method of performing color conversion by a color converter included in an imaging device to convert a set of input color values to color values in an output color space for use in printing using said imaging device, the method comprising:

receiving the set of input color values by the color converter included in the imaging device;

representing an output color in said output color space as a cubic lattice having a plurality of lattice points defining a plurality of subcubes, each of said plurality of lattice points having an address defined by a particular set of input color values;

using said set of input color values with respect to said cubic lattice to determine a set of four tetrahedron lattice points out of a set of eight subcube lattice points representing a subcube in said cubic lattice that neighbor a point corresponding to said set of input color values to be interpolated; and determining a lattice point of said set of four tetrahedron lattice points to provide as a pseudo-interpolated result of said color conversion in a non-constrained manner, wherein repeating said determining for said set of input color values does not necessitate a determining of a same lattice point of said set of four tetrahedron lattice points to provide as said pseudo-interpolated result of said color conversion.

8. The method of claim 7, wherein the act of determining said lattice point of said set of four tetrahedron lattice points includes:

choosing a random number; and utilizing said random number to determine a first lattice point of said set of four tetrahedron lattice points to provide as a pseudo-interpolated result of said color conversion.

9. The method of claim 8, further comprising repeating said method for the same set of input color values, said method returning a second lattice point of said set of four tetrahedron lattice points different from said first lattice point.

10. The method of claim 7, wherein said first lattice point of said set of four tetrahedron lattice points is chosen according to the following algorithm:

if (D>X)

the chosen lattice point=Pxyz1 else if (E>X)

the chosen lattice point=Pxyz2 else if (F>X)

the chosen lattice point=Pxyz3 else the chosen lattice point Pxyz4 wherein:

X is said random number;

D is the lower four least significant bits of a first color value of said set of input color values value;

E is the lower four least significant bits of a second color value of said set input color values;

F is the lower four least significant bits of a third color value of said set of input color values; and each of Pxyz1, Pxyz2, Pxyz3, Pxyz4 is one of said set of lattice points.

11. The method of claim 7, wherein said set of input color values is a set of RGB color values.

12. The method of claim 11, wherein the act of using said set of input color values includes:

selecting said set of RGB color values to be interpolated with respect to said cubic lattice, said set of said RGB color values including a plurality of bits representing a red (R) color component, a plurality of bits representing a green (G) color component and a plurality of bits representing a blue (B) color component;

using a set of most significant bits of each of said plurality of bits representing said red (R) color component, said plurality of bits representing said green (G) color component and said plurality of bits representing said blue (B) color component in said set of RGB color values to determine said subcube of said plurality of subcubes having said set of eight subcube lattice points neighboring said point corresponding to said set of RGB color values to be interpolated; and using a set of least significant bits of each of said plurality of bits representing said red (R) color component, said plurality of bits representing said green (G) color component and said plurality of bits representing said blue (B) color component in said set of RGB color values to determine said set of four tetrahedron lattice points out of said set of eight subcube lattice points.

13. A method of performing color conversion by a color converter included in an imaging device to convert a set of RGB (red, green, blue) color values to color values in an output color space for use in printing using said imaging device, the method comprising:

receiving the set of input color values by the color converter included in the imaging device;

representing an output color in said output color space as a cubic lattice having a plurality of lattice points defining a plurality of subcubes, each of said plurality of lattice points having an address defined by a particular set of RGB color values;

using the set of RGB color values with respect to said cubic lattice to determine a set of four tetrahedron lattice points out of a set of eight subcube lattice points representing a subcube in said cubic lattice that neighbor a point corresponding to said set of RGB color values to be interpolated;

choosing a random number X; and choosing a first lattice point of said set of four tetrahedron lattice points by executing the following algorithm included in a computer readable storage medium:

if(Bn>X)

the chosen lattice point=Pxyz1 else if (Go>X)

the chosen lattice point=Pxyz2 else if (Rq>X)

the chosen lattice point=Pxyz3 else the chosen lattice point=Pxyz4 wherein:

X is said random number;

Bn is the lower n least significant bits of the blue value;
Go is the lower o least significant bits of the green value;
Rq is the lower q least significant bits of the red value;
each of Pxyz1, Pxyz2, Pxyz3, Pxyz4 is one of said set of four tetrahedron lattice points; and
each of n, o, q is an integer.

14. The method of claim 13, further comprising repeating said method for the same set of RGB color values, said method returning a second lattice point of said set of four tetrahedron lattice points different from said first lattice point.

15. The method of claim 13, wherein as a result of said random number, said method is not constrained to always return the same lattice point of said set of four tetrahedron lattice points for a given set of RGB color values.

* * * * *